US011428414B2

(12) United States Patent
Bland et al.

(10) Patent No.: US 11,428,414 B2
(45) Date of Patent: Aug. 30, 2022

(54) PREMIX FUEL NOZZLE FOR A GAS TURBINE AND COMBUSTOR

(71) Applicant: BEIJING HUATSING GAS TURBINE & IGCC TECHNOLOGY CO., LTD, Beijing (CN)

(72) Inventors: Robert Bland, Oviedo, FL (US); John Battaglioli, Ballston Lake, NY (US); Shanshan Zhang, Beijing (CN); Xiaoehen Zha, Beijing (CN)

(73) Assignee: BEIJING HUATSING GAS TURBINE & IGCC TECHNOLOGY CO., LTD, Beijing (CN)

( * ) Notice: Subject to any disclaimer, the term of this patent is extended or adjusted under 35 U.S.C. 154(b) by 562 days.

(21) Appl. No.: 16/346,432

(22) PCT Filed: Oct. 31, 2017

(86) PCT No.: PCT/CN2017/108539
§ 371 (c)(1),
(2) Date: Apr. 30, 2019

(87) PCT Pub. No.: WO2018/082539
PCT Pub. Date: May 11, 2018

(65) Prior Publication Data
US 2020/0063964 A1  Feb. 27, 2020

(30) Foreign Application Priority Data
Nov. 1, 2016 (CN) .......................... 201610935731.4

(51) Int. Cl.
*F23R 3/28* (2006.01)
*F02C 3/14* (2006.01)
(52) U.S. Cl.
CPC ............... *F23R 3/286* (2013.01); *F02C 3/14* (2013.01); *F05D 2220/32* (2013.01)

(58) Field of Classification Search
CPC ............... F23R 3/28; F23R 3/286; F23R 3/32
See application file for complete search history.

(56) References Cited

U.S. PATENT DOCUMENTS 2,780,916 A    2/1957  Collins
6,880,340 B2*  4/2005  Saitoh .................... F23D 14/70
                                                   60/737
(Continued)

FOREIGN PATENT DOCUMENTS

JP    2002257342 A    9/2002
JP    2004361035 A    12/2004
(Continued)

OTHER PUBLICATIONS

PCT/CN2017/108539 International Search Report and Written Opinion dated Feb. 8, 2018, 7 pages.
(Continued)

*Primary Examiner* — Arun Goyal
(74) *Attorney, Agent, or Firm* — Lathrop GPM LLP

(57) ABSTRACT

A nozzle tip for a premix fuel nozzle includes an outer body having an outer body external face facing the downstream end of the burner tube, the outer body external face having a smaller cross-sectional area than the cross-sectional area of the burner tube; and at least one segment radiating radially outwardly toward the internal wall of the burner tube from the outer body, wherein each segment has a proximal end disposed adjacent to the outer body external face and a distal end disposed in a direction toward the burner tube, wherein each segment has a segment downstream face angled relative to the longitudinal axis of the burner tube towards the downstream end of the burner tube. When the gas turbine is in operation, an axial flow field of an air and fuel mixture flows through the burner tube and around the nozzle tip, and two or more recirculation zones of differing radial extent are
(Continued)

generated on the nozzle tip by the segments to provide strong flame holding and flame propagation.

15 Claims, 14 Drawing Sheets

(56) References Cited

U.S. PATENT DOCUMENTS

| | | | | |
|---|---|---|---|---|
| 10,184,666 | B2* | 1/2019 | Meadows | F23D 14/64 |
| 2002/0014078 | A1* | 2/2002 | Mandai | F23R 3/286 |
| | | | | 60/737 |
| 2009/0111063 | A1* | 4/2009 | Boardman | F23R 3/36 |
| | | | | 431/8 |

FOREIGN PATENT DOCUMENTS

| | | |
|---|---|---|
| JP | 2007033025 A | 2/2007 |
| JP | 2012088036 A | 5/2012 |

OTHER PUBLICATIONS

European Patent Application No. 17866555.0 extended Search and Opinion dated Apr. 22, 2020, 7 pages.
Japanese Patent Application No. 2019-544967, Office Action dated Jun. 30, 2020, 4 pages.
Japanese Patent Application No. 2019-544967, English translation of Office Action dated Jun. 30, 2020, 4 pages.

* cited by examiner

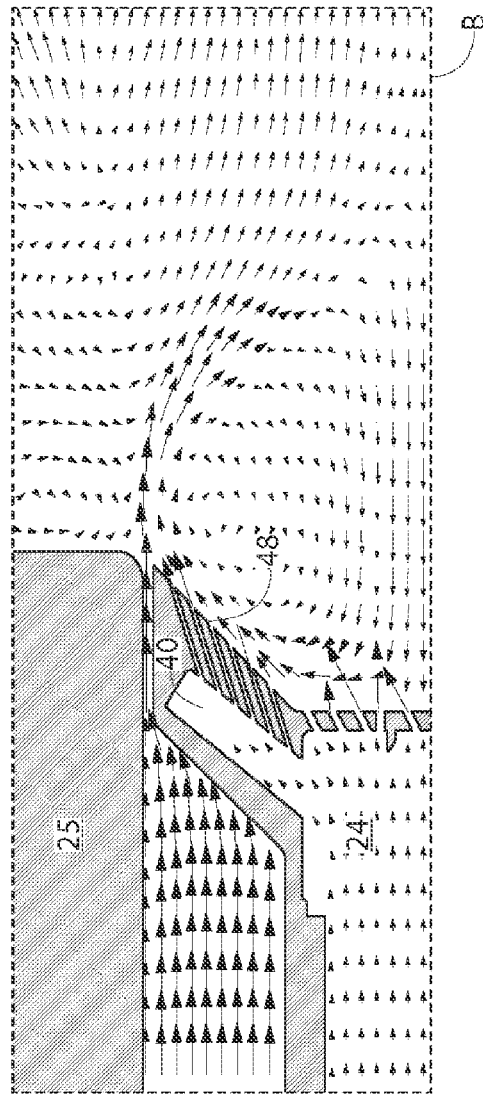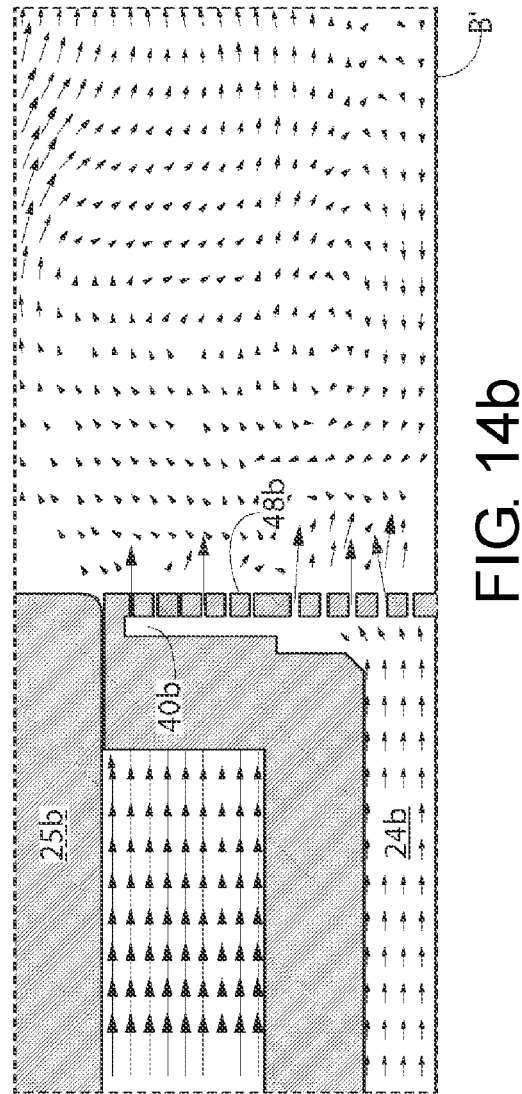

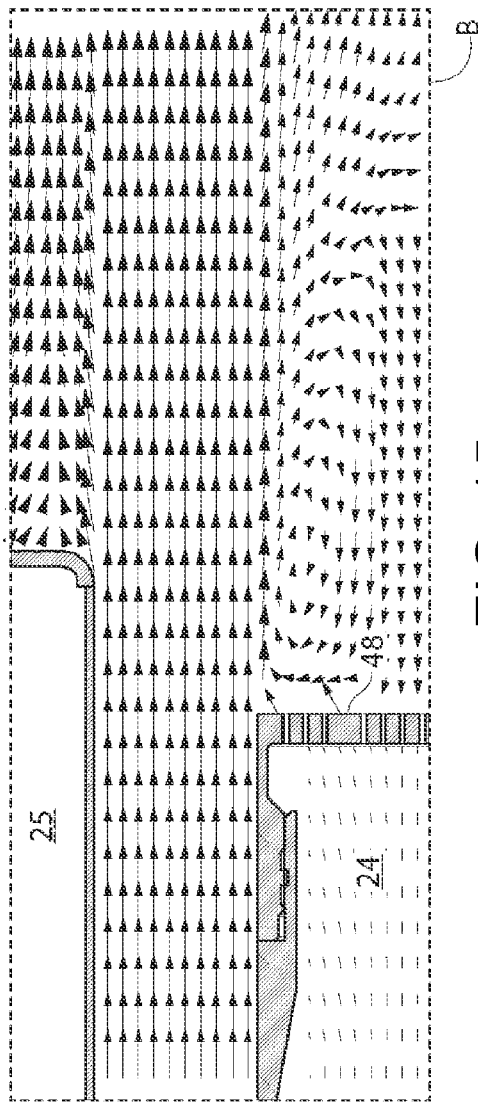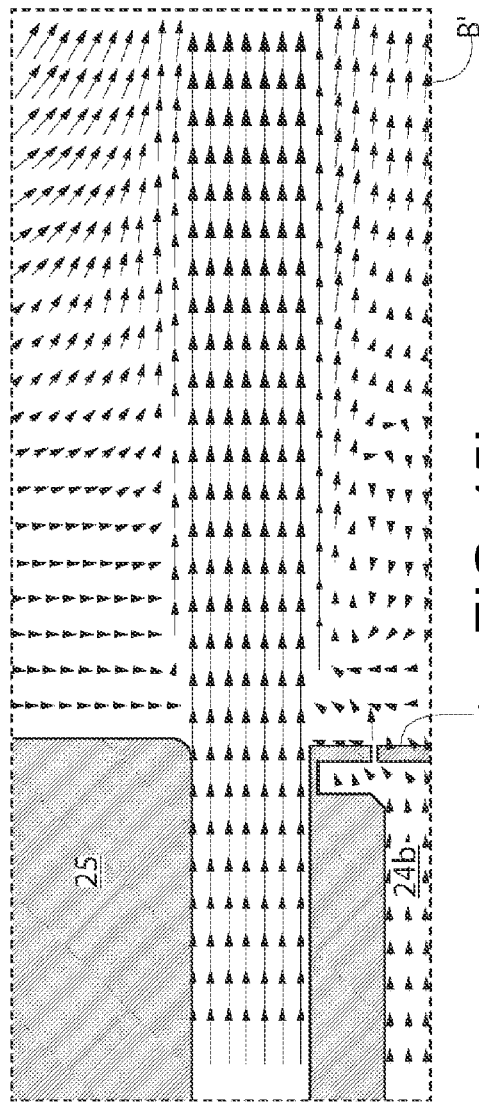

PREMIX FUEL NOZZLE FOR A GAS TURBINE AND COMBUSTOR

BACKGROUND OF THE INVENTION

The present invention is directed to a combustor for a gas turbine. More particularly, the present invention is directed to an improved fuel nozzle for a combustor for a gas turbine.

A typical gas turbine, as commonly used in power generation, uses a combustor to produce combustion gases having high pressure and high temperature to produce work. Such a gas turbine typically includes an inlet section, a compressor section, a combustion section, a turbine section and an exhaust section. More specifically, the compressor section supplies a compressed working fluid to the combustion section. The compressed working fluid and a fuel are mixed within the combustion section and burned to generate combustion gases at high pressure and temperature. The combustion gases flow to the turbine section where they expand to produce work. The expanded gases are released in the exhaust section.

The combustion section includes one or more combustors, each having a combustion casing, an end cover, a cap, fuel nozzles (including a center premix nozzle and several outer premix nozzles surrounding the center premix nozzle), a liner, a flow sleeve and a transition piece. The center premix nozzle and the outer premix nozzles take fuel either directly from a connection outside the engine or from a fuel manifold (end cover) and deliver it to the combustor.

The nozzle requirements include feeding various fluids supplied by the end cover to their desired injection ports, providing flow and fuel distribution to ensure proper functioning of the combustor, holding the flame adjacent to the nozzle without damage to the combustor for a required maintenance interval, and adequate passage seals to provide leak free sealing.

With respect to the nozzle holding the flame, most combustors have a location on the nozzle that "holds" flame. Holding a flame requires a zone of the combustor where the flow is generally slow and the residence time relatively long. This zone then swaps partially burnt combustion products with main flow regions, setting them alight, and is itself recharged by the main flow which gives it more fuel and air to burn to keep the zone hot.

Relatively little heat release occurs in the flame holding zones. For example, 6% of the total combustion chamber heat release may occur in the flame holding zones. These zones are however very important as they define the stability and shape of the flame and thus the success of the combustor.

Previous flame holder concepts have generally been either bluff body or swirl stabilized. Bluff body flame holding is where a part of the combustor creates a low speed zone downstream of it where the axial flow speed is low enough to allow flame to remain in it; most such devices create either a trapped or partially trapped vortex in them, as seen, for example, in U.S. Pat. No. 7,003,961 (Kendrick et al.). Swirl stabilized flame holding is where a swirler swirls the flow that then naturally blooms and creates a recirculation at its core, as seen, for example, in U.S. Pat. No. 6,438,961 (Tuthill et al.). The flame can reside stably in the toroidal vortex created and ignite the inner surface of the flow passing down the burner tube. Depending on the geometry/expansion ratio, there could also be a vortex outboard of the flow which could also form a flame holder. Some systems use a combination of bluff body and swirl stabilized flame holding.

It is advantageous in most designs for nozzles to have flames anchored on their downstream tips. The tips are often not very large in that they take up flow area. Therefore, the larger the tip size, the larger the burner tube must be to maintain the same flow area.

Alternatively, the flow must be increased if the same burner tube size is retained. Increased losses result. It is advantageous and typically more stable to have the biggest recirculation zone possible. Recirculation zones bring hot products from the reaction zone upstream along the nozzle centerline to mix with fresh fuel air mixture delivered by the nozzle. One way to increase the size of the recirculation zone is to swirl the flow. A blade in the premixing zone spins the flow. This flow passes down an annular pipe until the end of the nozzle, or slightly beyond (if the tip is recessed). Once the swirling flow is unconstrained in free space, the flow expands as there is no longer the constraining force applied by the wall of the annular tube.

This expanding flow shears the air on its inner side. Since it is pushing the outer air downstream, air has to come upstream on the centerline to replace the air being displaced. This flow therefore forms into a toroidal vortex, which, since the flow shearing on the outer is also spinning in the direction of swirl.

In premix nozzle designs, in most configurations, the majority of air comes through the upstream face of the liner as it mixed with the fuel prior to entry into the liner and combustion.

Swirling the flow has several consequences. Swirling the flow at, for example, 45 degrees against 25 degrees results in higher pressure drop which can use up, for example, 390 KW of energy in a 70 MW gas turbine. That energy is dissipated as heat, some of which is recovered as it expands through the cycle but leads to overall lower power and efficiency. Obviously, not swirling the flow at all would give even bigger gains.

One way of reducing the pressure loss is to reduce the speed of the flow in the burner tubes as the loss is proportional to velocity squared. The presence of larger burner tubes results in even less free cap space available for expansion. It also places the flow streams closer together which increase the shear rates between the flows exiting the premixers.

The use of a swirling flow makes it very difficult or impossible to design nozzles that are not circularly symmetric. Additionally, it is very difficult to design the flame shape by varying a property circumferentially, as the rotating nature of the flow is continually changing its relationship to physical features such as the liner and the neighboring nozzles. One area that swirl does help with is mixing. The longer helical flow path that results from a swirling flow gives more distance for the mixing to occur.

The outer nozzles have an advantage inherent in swirl based systems. The nozzles, by design/concept, have circular symmetry. While flame shape and properties can be varied, it is typically only a radial property, such as fuel profile or swirl that can be varied.

Within the fuel nozzle, air and fuel are premixed prior to burning. By premixing the fuel and air, the air is effectively a diluent as there is more air mixed with the fuel than is required to burn all the fuel, and therefore, when the fuel burns, it heats both the combustion products and excess air simultaneously. Production of the pollutant NOx (Nitrous Oxides) is strongly related to temperature. Therefore, by minimizing flame temperature, the production of NOx is minimized.

It would be desirable to create a nozzle architecture that utilizes axial flow rather than swirl that creates strong local flame holding and flame propagation, allowing for design of the shape of the downstream flame sheet. This is possible with linear flow as any part of the nozzle tip may be unique. For the purposes of the present invention, "axial flow" is intended to mean a flow field with nominally zero net swirl. As defined, "axial flow" may have secondary motion. In this case, there may be flow features with radial and circumferential velocities but the net swirl/radial velocity is essentially zero.

All references cited herein are incorporated herein by reference in their entireties.

BRIEF SUMMARY OF THE INVENTION

A premix fuel nozzle for a gas turbine is provided which includes a nozzle tip disposed in a burner tube. The burner tube has an internal wall, an open internal volume having a length extending between an upstream end and a downstream end of the burner tube, a longitudinal axis and a cross-sectional area perpendicular to the longitudinal axis. The nozzle tip includes an outer body having an outer body external face facing the downstream end of the burner tube. The outer body external face has a smaller cross-sectional area than the cross-sectional area of the burner tube. The nozzle tip further includes one or more segments radiating radially outwardly toward the internal wall of the burner tube from the outer body, wherein each segment has a proximal end disposed adjacent to the outer body external face and a distal end disposed in a direction toward the burner tube. Each segment has a segment downstream face angled relative to the longitudinal axis of the burner tube towards the downstream end of the burner tube. When the gas turbine is in operation, an axial flow field of an air and fuel mixture flows through the burner tube and around the nozzle tip, and two or more recirculation zones of differing radial extent are generated on the nozzle tip by the segments to provide strong flame holding and flame propagation.

The distal end of at least one of the segments may extend partially or fully to the internal wall of the burner tube. The outer body may surround an inner plenum where the inner plenum is adapted to receive cooling air. Here, the outer body has an open end and a closed end, the closed end having an internal face adjacent to the inner plenum. The closed end may have a plurality of cooling bore holes extending between the internal face and the outer body external face.

Each segment may have an internal conduit having an open proximal end and a closed distal end, the open proximal end in fluid communication with the inner plenum, wherein the air is adapted to pass from the inner plenum into the internal conduit. Each segment may have a plurality of segment bore holes between the internal conduit and the segment downstream face, wherein the bore holes provide fluid communication between the internal conduit and the segment downstream face, to provide for the air to pass from the internal conduit through each segment. The segment downstream face of each segment may be planar. An angle of the segment downstream face relative to the longitudinal axis B of the burner tube 25 may be in the range of, for example, 105 to 165 degrees (e.g., approximately 135 degrees). The distal end of the at least one segment that fully extends to the internal wall of the burner tube may be closed and have a purge groove. Each segment of the segments may be equally circumferentially spaced about the outer body. A circumferential cross-sectional area of the proximal end of each segment may be larger than the circumferential cross-sectional area of the distal end of each segment. Each segment may have a U-shaped cross-section, wherein the cross-section is parallel to the longitudinal axis of the burner tube. Each segment may have an upstream face, wherein the upstream face is smoothly curved toward the segment downstream face. Each segment may have an upstream face, wherein the upstream face of each segment is angled relative to the longitudinal axis of the burner tube towards the downstream end of the burner tube.

A combustor for a gas turbine is also provided which includes a reaction zone and one or more premix fuel nozzles. The premix fuel nozzle or nozzles are for injecting a fuel and air mixture into the reaction zone. At least one of the premix fuel nozzles may include a fuel and air premixer and a nozzle tip disposed in a burner tube. The burner tube has an internal wall, an open internal volume having a length extending between an upstream end and a downstream end of the burner tube, a longitudinal axis and a cross-sectional area perpendicular to the longitudinal axis. The nozzle tip is as described above. When the gas turbine is in operation, an axial flow field of an air and fuel mixture flows through the burner tube and around the nozzle tip, and two or more recirculation zones of differing radial extent are generated on the nozzle tip by the segments to provide strong flame holding and flame propagation. The at least one premix fuel nozzle may be a single center premix fuel nozzle wherein the combustor contains at least one outer premix fuel nozzle of a different type. The one or more premix fuel nozzles may include both a single center premix fuel nozzle and at least one outer premix fuel nozzle.

BRIEF DESCRIPTION OF SEVERAL VIEWS OF THE DRAWINGS

The invention will be described in conjunction with the following drawings in which like reference numerals designate like elements and wherein:

FIG. 14a is a simplified, partial, simulated flow field through a burner tube and around a nozzle tip of the present invention, wherein the flow field is shown around the segments of the nozzle tip;

FIG. 14b is a simplified partial, simulated flow field through a burner tube and around a nozzle tip having segment downstream faces not angled relative to the longitudinal axis of the burner tube, in contrast to the present invention;

FIG. 15a is a simplified, partial, simulated flow field through a burner tube and around a nozzle tip of the present invention, wherein the flow field is shown between segments; and FIG. 15b is a simplified, partial, simulated flow field through a burner tube and around a nozzle tip having segment downstream faces not angled relative to the longitudinal axis of the burner tube, wherein the flow field is shown between segments, in contrast to the present invention

DETAILED DESCRIPTION OF THE INVENTION

The invention will be illustrated in more detail with reference to the following embodiments but it should be understood that the present invention is not deemed to be limited thereto.

Figure 1:
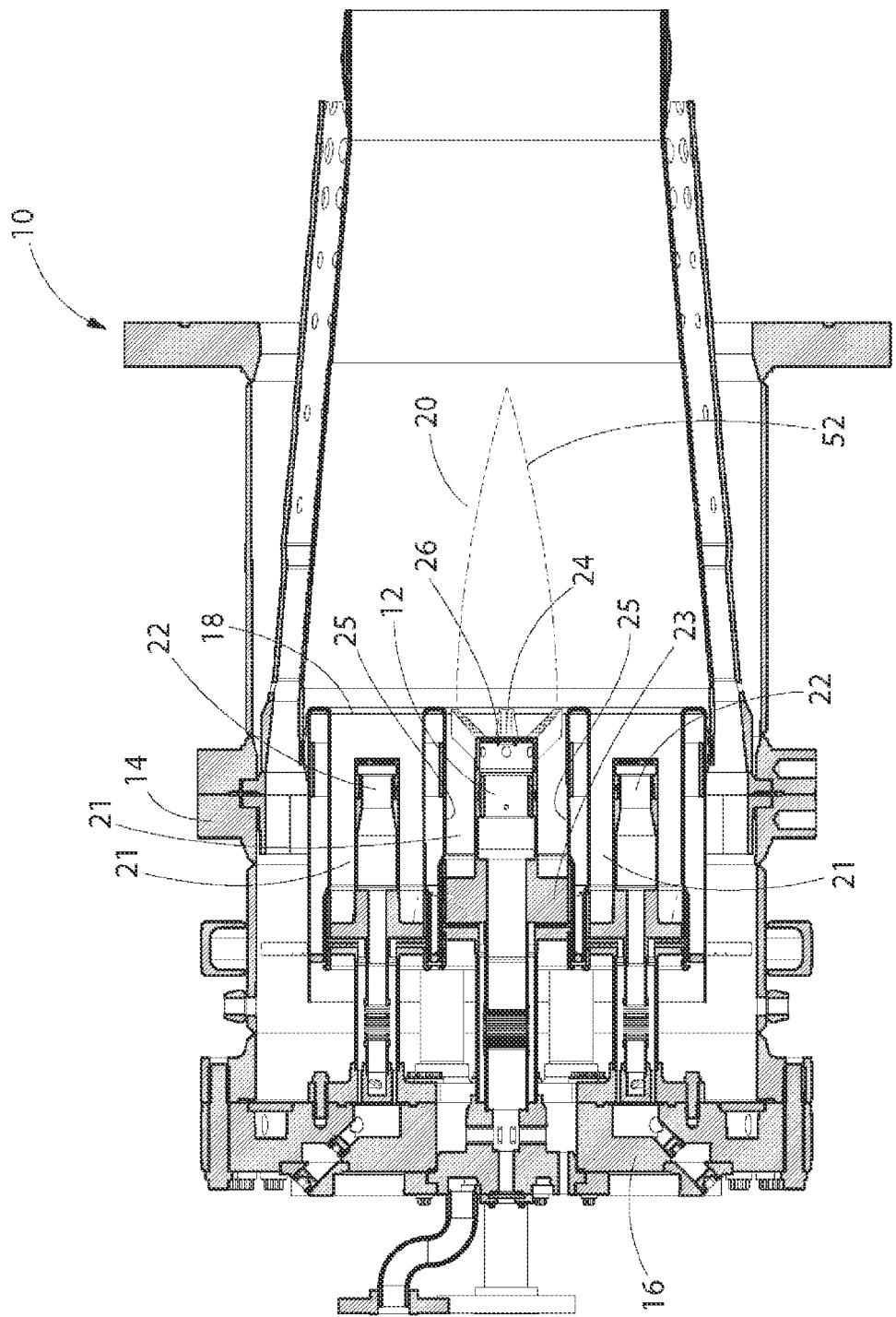
FIG. 1 is a simplified cross-sectional, elevation view of gas turbine combustor having a premix fuel nozzle in accordance with an exemplary embodiment of the present invention.
Figure 2:
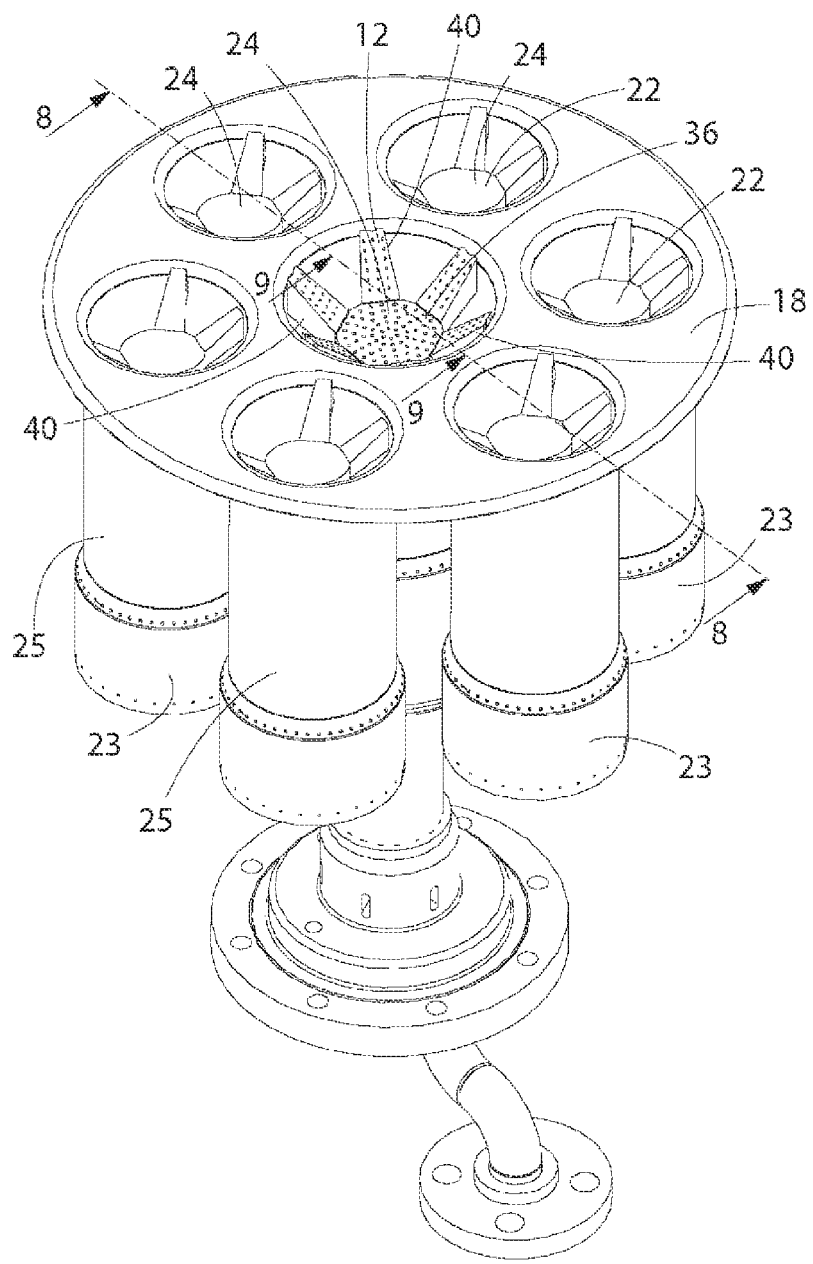
FIG. 2 is a front, isometric view of a cap front plate, premix nozzle and burner tubes of the combustor of FIG. 1.
Figure 3:
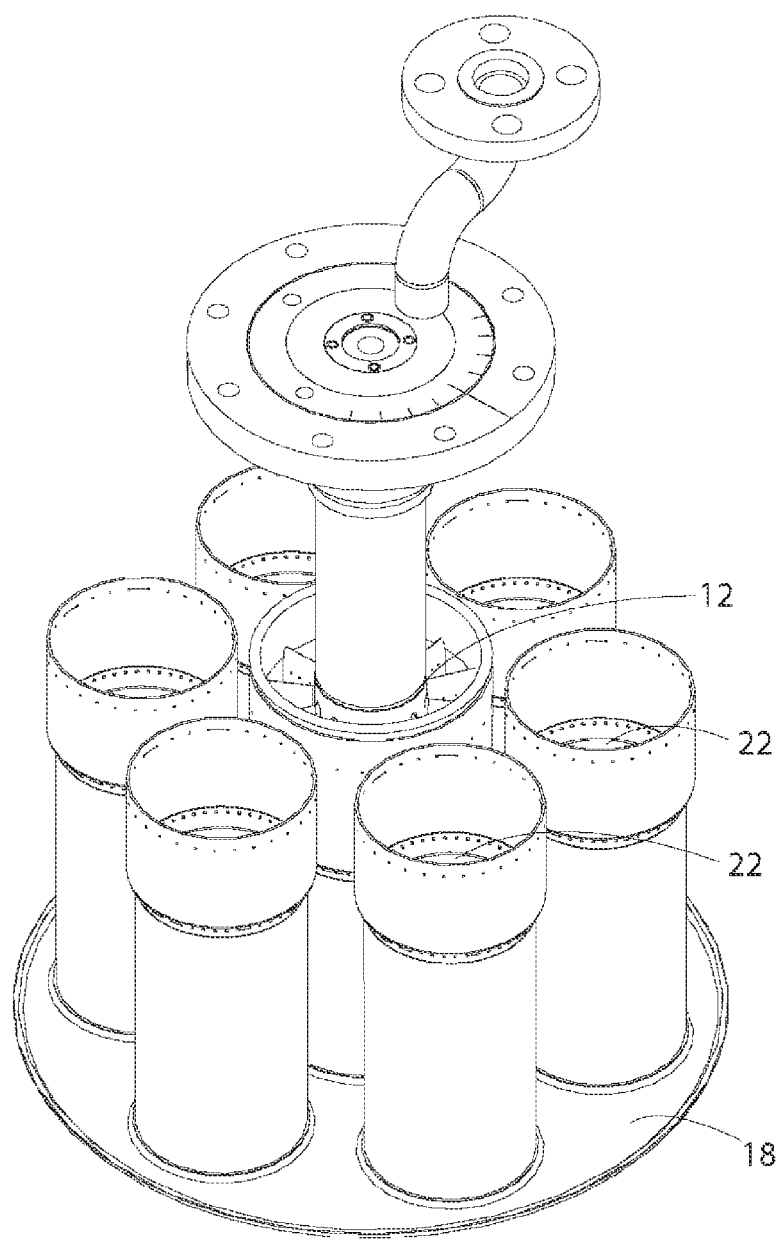
FIG. 3 is a rear, isometric view of the cap front plate and burner tubes of FIG. 2, shown without outer premix fuel nozzles for clarity.

Referring now to the drawing figures, wherein like part numbers refer to like elements throughout the several views, there is shown in FIG. 1 a combustor 10 having premix nozzles 12, 22 in accordance with a first exemplary embodiment of the present invention. The primary components of the combustor 10 include a combustion casing 14, an end cover 16, a cap 18, a reaction zone 20, the center premix fuel nozzle 12 and a plurality of outer premix fuel nozzles 22. The nozzles 12, 22 are for injecting an air and fuel mixture 21 into the reaction zone 20.

As best seen in FIGS. 2-9, the premix fuel nozzles 12, 22 generally include a fuel and air premixer 23, a nozzle tip 24 and a burner tube 25. It is noted that the present invention for a nozzle tip 24 may be satisfactorily used with some of or all of the center premix fuel nozzle 12 and the outer premix fuel nozzles. For clarity, the invention is generally described here with respect to the center premix nozzle alone, but the nozzle tip 24 of the present invention may be used with any nozzle 12, 22.

The nozzle tip 24 includes an outer body 26 surrounding an optional inner plenum 28. The burner tube 25 has an internal wall 27, an open internal volume 29, and has a length 31 extending between an upstream end 33 and a downstream end 35 of the burner tube 25 (see FIG. 8). The burner tube 25 has a longitudinal axis B and a cross-sectional area 39 (shown as cross-hatched area in FIG. 4) that is perpendicular to the burner tube 25.

The outer body 26 of the nozzle tip 24 has an open end 30, a closed end 32 and an outer body external face 36 on the closed end 32 facing the downstream end 35 of the burner tube 25. The outer body external face 36 faces the downstream end 35 of the burner tube 25 and has a smaller cross-sectional area 37 than the cross-sectional area 39 of the burner tube 25 (compare the diagonal lined section to the cross-hatched portion of FIG. 4. The outer body external face 36 may be planar.

The optional inner plenum 28 is adapted to receive cooling air. The closed end 32 of the nozzle tip 24 has an internal face 34 adjacent to the inner plenum 28. The closed end 32 has a plurality of bore holes 38 extending between the internal face 34 and the outer body external face 36. These bore holes 38 may be disposed at an angle relative to the longitudinal axis B of the burner tube 25, as is known in the art.

As seen in FIGS. 5-9, at least one segment 40 radiates outwardly from the outer body 26 towards the internal wall 27 of the burner tube 25, for example, at evenly spaced circumferential intervals. Each segment 40 may be the same length or different lengths and may extend fully to the burner tube internal wall 27 or partially to the burner tube internal wall 27. An example of a burner tip 24' having different length segments at irregular angles 40' is shown in FIGS. 10-13. The burner tip 24' is shown without the optional bore holes (discussed below).

With respect to the center premix nozzle 12, the simplest usage has an equal number of segments 40 to the quantity of outer premix nozzles 22. One permutation has the segments 40 align with the outer premix nozzles 22 to carry flame from the center premix nozzle 12 to the outer premix fuel nozzles 22.

Figure 8:
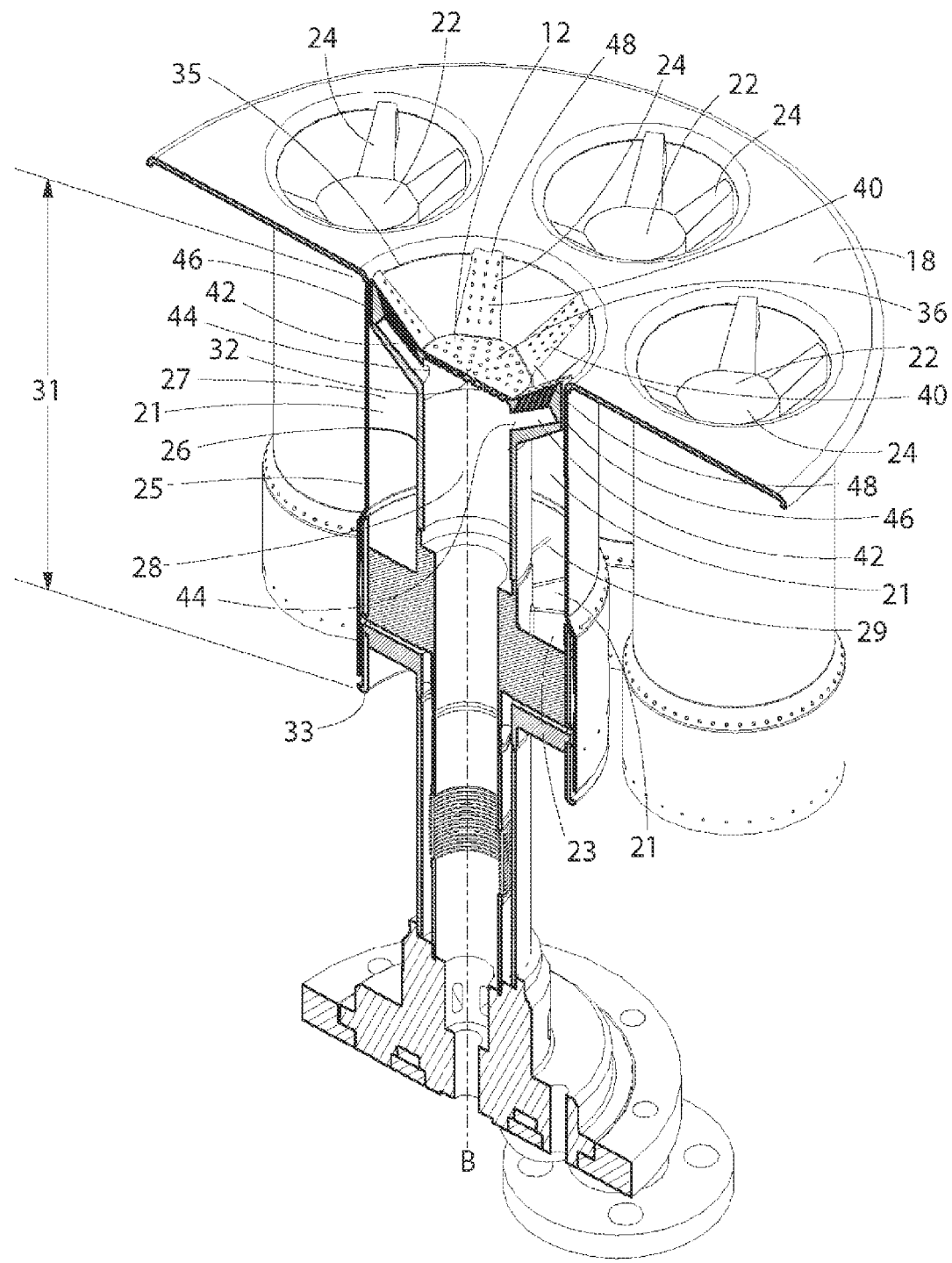
FIG. 8 is a cross-sectional, isometric view of the cap front plate, premix nozzle, and burner tubes of FIG. 2, taken substantially along lines 8-8 of FIG. 2.
Figure 9:
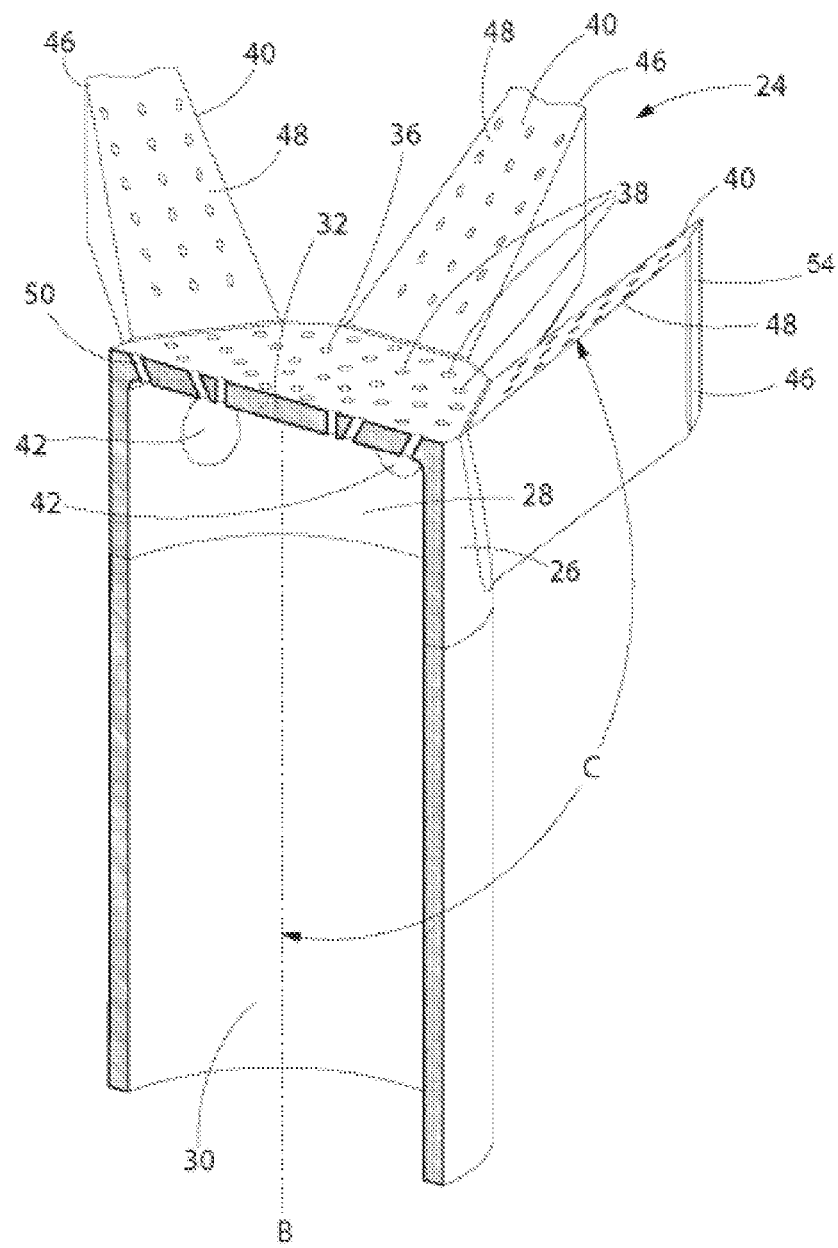
FIG. 9 is a cross-sectional, isometric view of the center nozzle assembly of FIG. 6, taken substantially along the lines 9-9 of FIG. 2.
Figure 10:
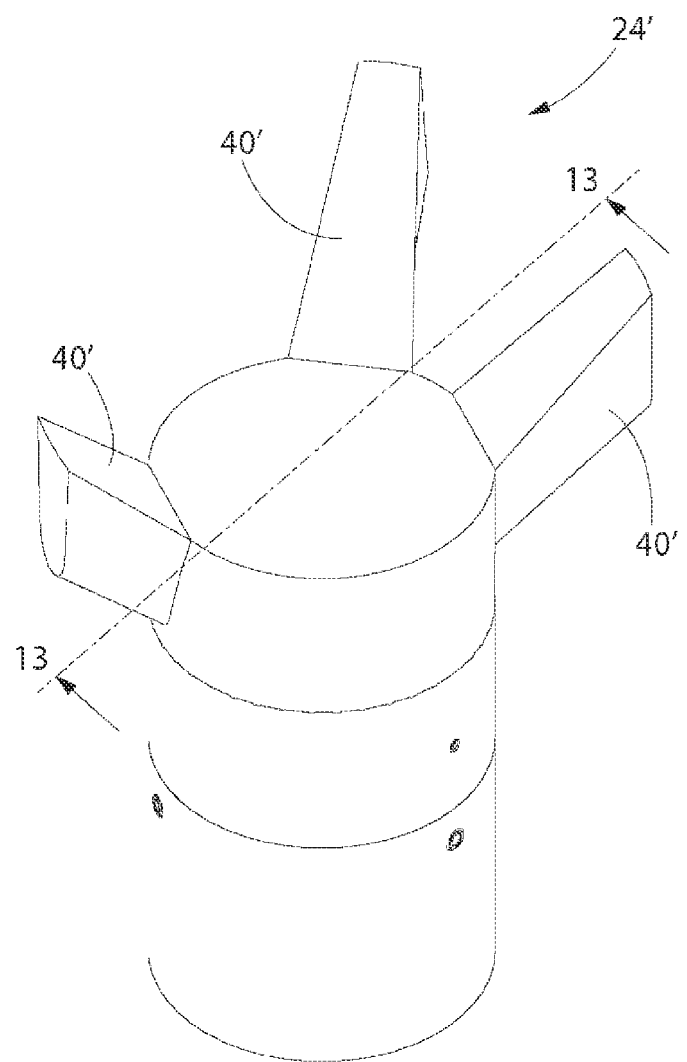
FIG. 10 is a front, isometric view of the an alternate nozzle tip for a premix fuel nozzle of FIG. 1.
Figure 12:
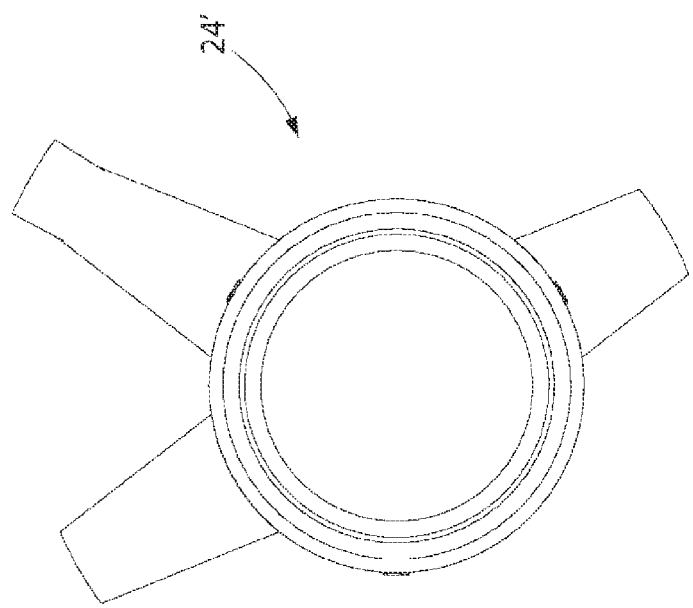
FIG. 12 is a rear, elevation view of the nozzle tip of FIG. 10.
Figure 11:
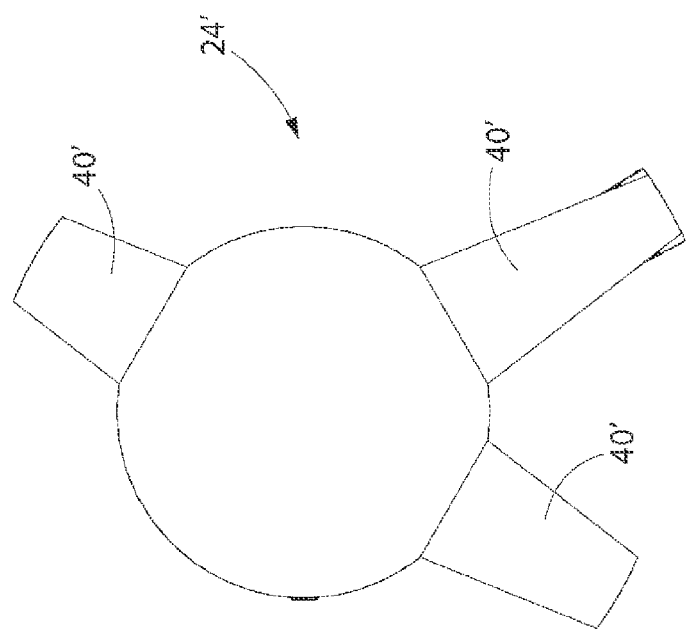
FIG. 11 is a front, elevation view of a nozzle tip for the premix fuel nozzle of FIG. 10.
Figure 13:
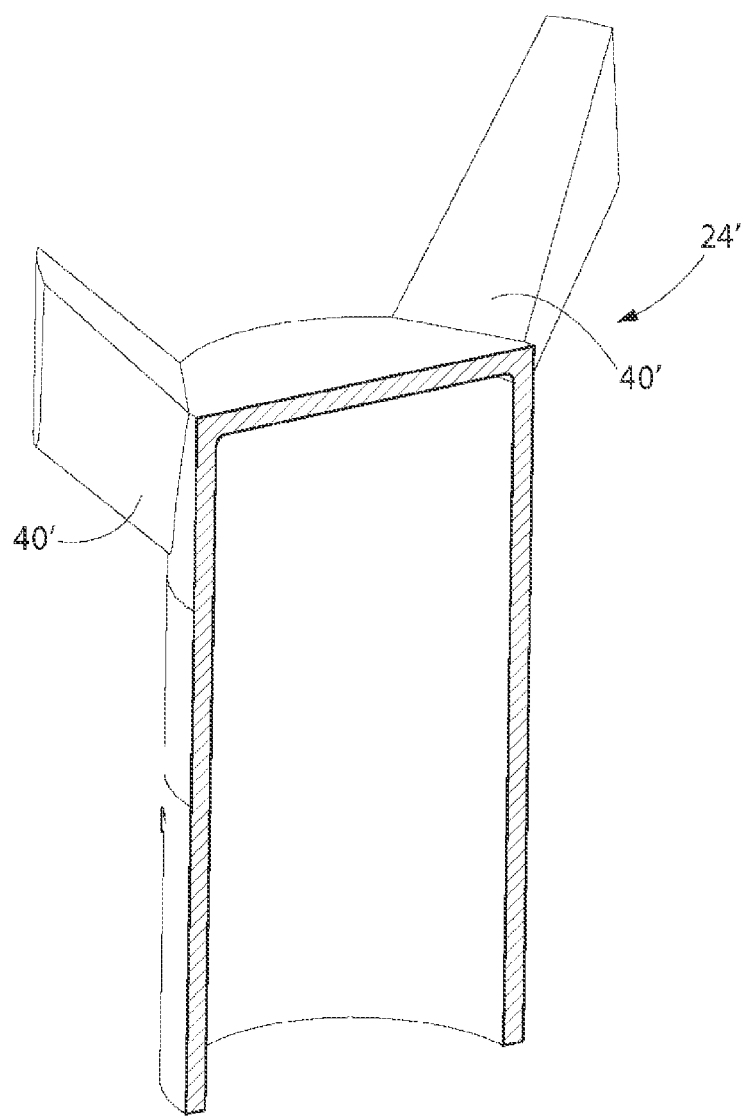
FIG. 13 is a cross-sectional, isometric view of the center nozzle assembly of FIG. 6, taken substantially along the lines 13-13 of FIG. 10.

As best seen in FIG. 9, each segment 40 may have an internal conduit 42 having an open proximal end 44 (see FIG. 8) in fluid communication with the inner plenum 28, wherein air is adapted to pass from the inner plenum 28 into the internal conduit 42. Each segment 40 also has a closed distal end 46, a segment downstream face 48 (e.g., planar) disposed adjacent to the outer body external face 36 of the outer body 26, and, optionally, a plurality of segment bore holes 50 between the internal conduit 42 and the segment downstream face 48. The bore holes 50 provide fluid communication between the internal conduit 42 and the segment downstream face 48 to provide for air to pass from the internal conduit 42 through each segment 40. The segment downstream face 48 of each segment 40 may be at an angle relative to the longitudinal axis B of the burner tube 25, for example, an angle of 105 to 165 degrees. E.g., see FIG. 9, angle C.

Figure 4:
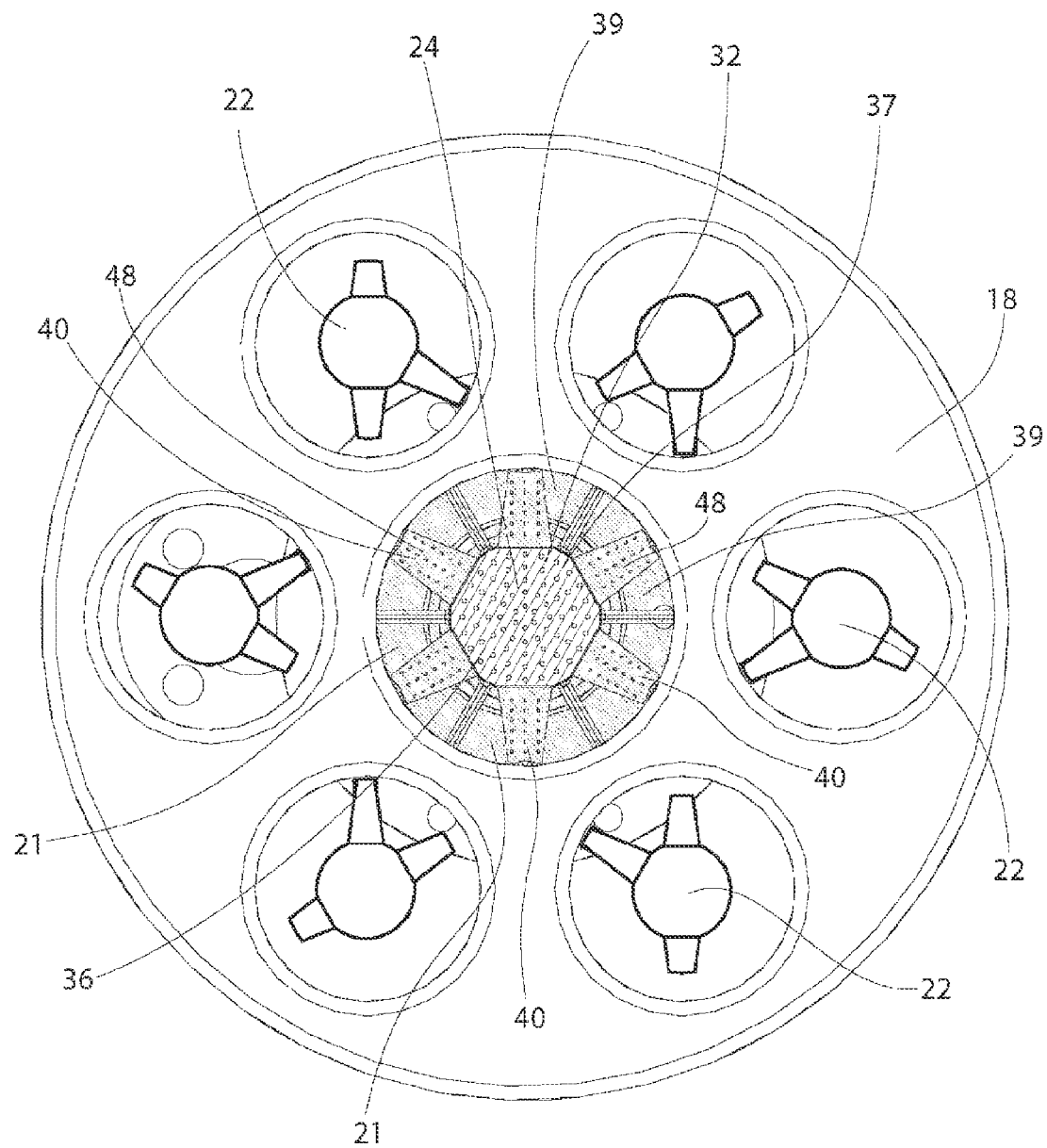
FIG. 4 is a front, elevation view of the cap front plate and burner tubes of FIG. 2.
Figure 5:
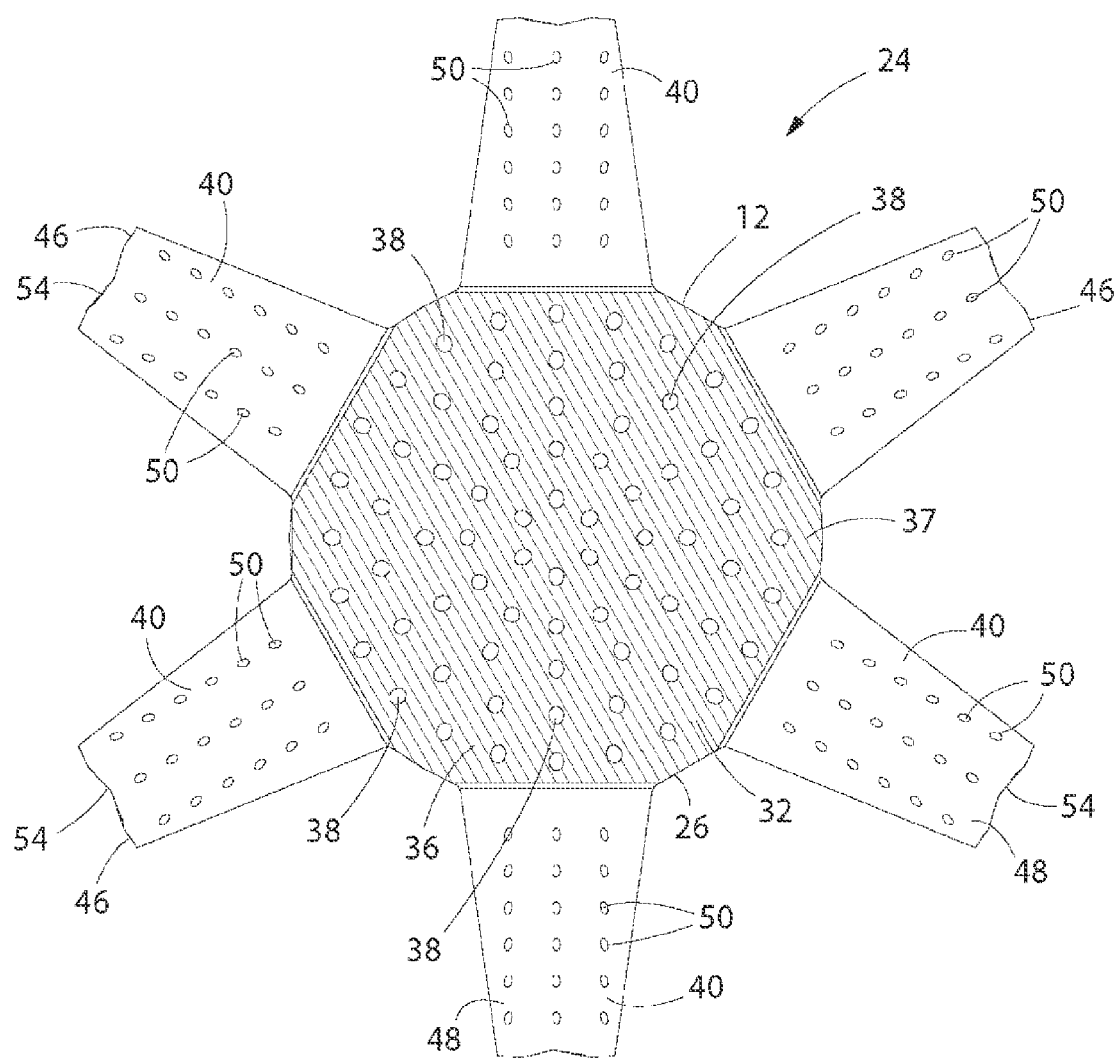
FIG. 5 is a front, elevation view of a nozzle tip for the premix fuel nozzle of FIG. 1.
Figure 6:
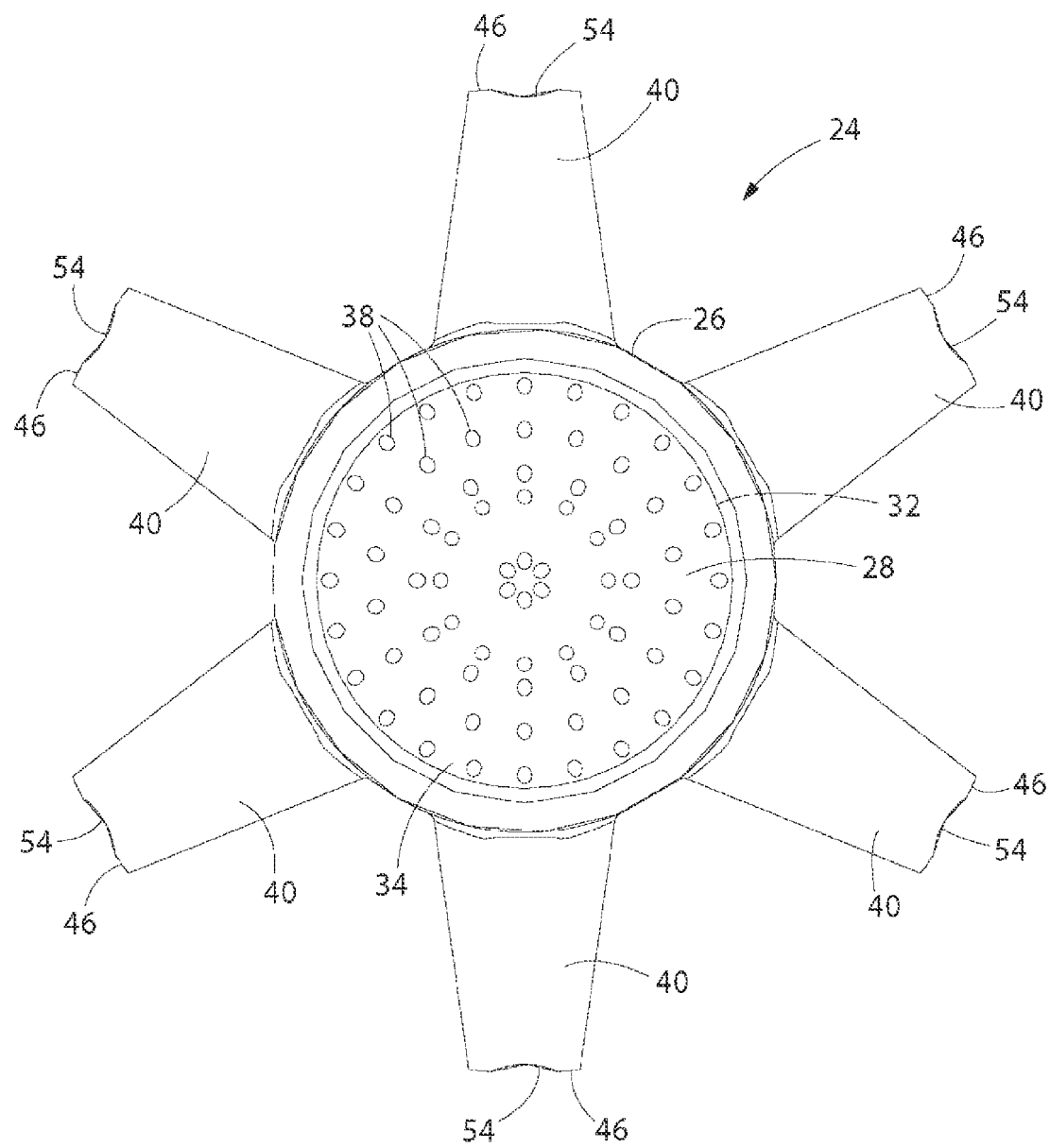
FIG. 6 is a rear, elevation view the nozzle tip of FIG. 5.
Figure 7:
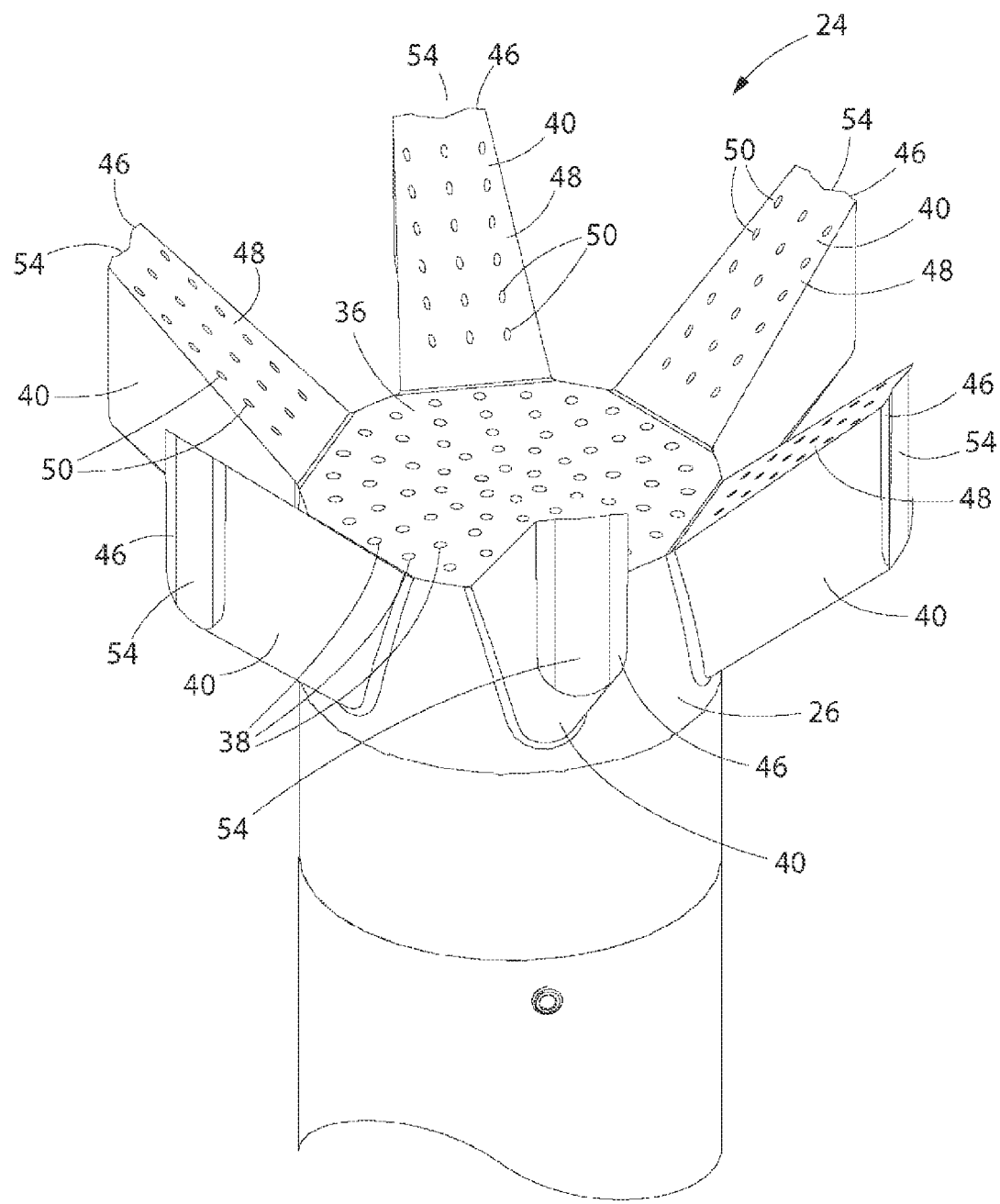
FIG. 7 is a front, isometric view of the nozzle tip of FIG. 5.

The closed distal end 46 of each segment 40 may include a purge groove 54 to ensure that there is always an air and fuel mixture flow passing over the nozzle tip 24. If the segment 40 is approximately the same height as the burner tube 25 and extends to the internal wall 27 of the burner tube (e.g., as shown in FIGS. 4 and 8), the purge groove 54 ensures that the area of the distal end 46 of the segment 40 is continually flushed even if the two parts are touching or nearly touching. Such a purge groove 54 is not necessary for shorter length segments 40' as shown in FIGS. 10-13.

The segments 40 may be of a shape shown in the various figures (see FIGS. 2 and 4-12). However, it is the intent of the present invention to include segments of substantially any elongate configuration that operates suitably to achieve the results desired, as stated herein. Generally, the upstream portions of the various segments 40 should have a suitable aerodynamic geometry to ensure there are substantially no separation zones upstream of the trailing edges (i.e., the edges of the segment downstream faces 48 of the segments 40). However, having such clean aerodynamic trailing edges of the various segments is of substantially lesser importance. The various segments 40 on a nozzle tip 24 may have identical physical geometries, but, alternatively, one or more segment 40 on a nozzle tip 24 may have an entirely different geometry, so long as the desired results described herein are achieved, including strong flame holding and strong flame propagation.

Constructed in this manner, the nozzle tip 24 creates two or more recirculation zones of differing radial extent combining to form an irregular toroidal recirculation zone 52 of the fuel and air mixture to provide strong flame holding and flame propagation. It is noted that a normal swirling nozzle has a single toroidal vortex that is a figure of revolution. In the present invention, the recirculation zone is composed of two or more zones of differing radial extent and is an irregular toroid, i.e., not a figure of revolution. The present invention creates different size vortices that may be tailored to create differing flame shapes with differing properties.

The present invention provides segments 40 to, in effect, make a hole in the flow of air and fuel mixture to create a low speed flow zone on the downstream side where axial velocity is lower than the flame speed and is spun up by the flow passing between the burner tube and the distal ends 46 of the segments 40.

The segments 40 of the nozzle tip 24, if disposed in alignment with the outer premix nozzles 22, provide an apparatus by which the center premix nozzle 12, which is always operating, may share flame and ignite the outer premix nozzles 22 which stage on and off during the gas turbine load process. Here, flow moves from the center nozzle tip outboard towards the outer nozzle.

The problem solved by the present invention is the creation of a nozzle architecture that uses linear flow rather than swirl flow. The present invention creates a recirculation zone on the nozzle tip with two or more sizes of toroidal flow feature. This creates strong local flame holding and flame propagation while the simplicity of the flow field allows the explicit design of the shape of the downstream flame sheet and thus its properties (within the physical limitations of the design).

The goal of the present invention is to create a recirculation zone with differing radial extent downstream of the nozzle tip. In a swirling design the tip has circular symmetry and is a shape of rotation due to the swirling nature of the flow. In a design with linear flow, as in the present invention, that is not necessary. Any part of the tip can be unique.

The advantage of present invention is that it brings some of the features of a larger nozzle to a smaller nozzle. For example the present invention:
- increases the mass flow recirculated downstream of the nozzle making it more robust;
- carries flame to the outer radius of the burner tube to light the flow on the cap;
- allows different properties to be given to nozzle tip, which can affect the flame shape without altering any other part;
  - the size of every segment (height/width/shape/inclination) and its angular relationship to any other segment is arbitrary, thus giving great flexibility;
- the presence of multiple semi-independent flame holders allow the various parts to cross light if one is beginning to be extinguished. This results in exceptional lean blow out (LBO), i.e., the lowest stoichiometry where the nozzle can still reliably hold flame).

The present invention provides the ability to directly design the flame shape/geometric properties. In the past, features of the nozzles were altered in an effort to cause a change in flame properties, but the exact nature of that change was not well known. The complex interaction of a swirling flow, even with the relatively simple geometric environment of a combustor, can make true design effectively impossible. The effect of the swirl means that the clocking of any characteristic varies with axial distance so the change might be advantageous at one point and disadvantageous at another.

It is noted that the present invention requires each segment 40 to have a segment downstream face 48 angled relative to the longitudinal axis B of the burner tube towards the downstream end of the burner tube 25. Due to the fact that the downstream face 48 is angled, when the gas turbine is in operation, an axial flow field of an air and fuel mixture flows through the burner tube and around the nozzle tip, and two or more recirculation zones of differing radial extent are generated on the nozzle tip by the segments to provide strong flame holding and flame propagation.

This result does not occur if segments are present, but the segment downstream faces are not angled relative to the longitudinal axis of the burner tube towards the downstream end of the burner tube. Compare FIGS. 14*a* and 15*a* which show a partial simplified simulated flow field through a burner tube 25 and around a nozzle tip 24 of the present invention where a segment 40 has a downstream face 48 angled relative to the longitudinal axis B of the burner tube, to FIGS. 14*b* and 15*b* which show a simulated flow field through a burner tube 25*b* and around a nozzle tip 24*b* where a segment 40*b* has a downstream face 48*b* that is not angled relative to the longitudinal axis B' of the burner tube 25*b* (i.e., it is perpendicular to the longitudinal axis B' of the burner tube 25*b*). FIG. 14*a* shows a recirculation zone of a size similar to the segment height, while FIG. 14*b* does not.

The key characteristic of the segmented nozzle tip 24 of the present invention is this ability to create two or more vortices of different size downstream of the segment downstream face 48. The flow passing between the burner tube 25, the segment downstream faces 48 and the outer body 26 of the nozzle tip 24 shear on the air downstream of the segment downstream faces 48. This shearing motion carries flow downstream. Flow of the air and fuel mixture 21 therefore travels up the nozzle centerline to replace the displaced flow. Very rapidly after flow starts passing down the burner tube 25, vortices build up downstream of the nozzle tip 24. Since the external face of the nozzle tip 36 and segments 40 have differing radial dimensions the vortices associated with these structures are similarly of different sizes. There is a vortex produced downstream of each segment 40 and one for each zone between segments 40. Therefore, the total number of vortex structures is equal to twice the number of segments 40 with a minimum of two for a single segment 40.

This result does not occur in bluff body systems, shown, for example, in the flameholder of FIG. 4 of U.S. Pat. No. 7,003,961 (Kendrick et al.) (discussed in the Background, above). More particularly, the center body and struts displace flow and create areas of low speed flow downstream of them. Flow in the central flame holding trapped cavity expands as it burns as a result of the temperature rise causing a significant drop in density. The volume produced will partially expand into the low speed zone downstream of the strut as it is a path of lower resistance compared to displacing the high speed flow passing over the driven cavity in the center body. This flow will move outboard and be sheared by the flow passing over the two sides of the strut. This shearing will either excite Von Karmann vortex shedding or a pair of stable vortices, depending on the design details.

The axis of rotation of these vortices is parallel to the front face of the gutter or radial relative to the centerline of the combustor. Flow features with these characteristics do not cause the recirculation of flow onto the nozzle/combustor centerline as is the case for a nozzle tip 24 having segments with downstream faces 48 angled relative to the longitudinal axis B of the burner tube 25 towards the downstream end of the burner tube 25.

While the invention has been described in detail and with reference to specific embodiments thereof, it will be apparent to one skilled in the art that various changes and modifications can be made therein without departing from the spirit and scope thereof.

What is claimed is:

1. A premix fuel nozzle for a gas turbine comprising a nozzle tip disposed in a burner tube, said burner tube having an internal wall, an open internal volume having a length extending between an upstream end and a downstream end of the burner tube, a longitudinal axis and a cross-sectional area perpendicular to the longitudinal axis, said nozzle tip comprising:
   (a) an outer body having an outer body external face facing the downstream end of the burner tube, said outer body external face having a smaller cross-sectional area than the cross-sectional area of the burner tube; and
   (b) one or more segments, radiating radially outwardly toward the internal wall of the burner tube from said outer body, wherein each segment of the one or more segments has a proximal end disposed adjacent to the outer body external face and a distal end disposed in a direction toward the burner tube, wherein the each segment of the one or more segments comprises a segment downstream face angled relative to the longitudinal axis of the burner tube towards the downstream end of the burner tube;
   whereby, when the gas turbine is in operation, an axial flow field of an air and fuel mixture flows through the burner tube and around the nozzle tip, and two or more recirculation zones of differing radial extent are generated on the nozzle tip by the one or more segments to provide strong flame holding and flame propagation;
   wherein the outer body surrounds an inner plenum, said inner plenum adapted to receive cooling air, said outer body having an open end and a closed end, said closed end having an internal face adjacent to the inner plenum;
   wherein the each segment of the one or more segments comprises:
   (a) an internal conduit having an open proximal end and a closed distal end, the open proximal end in fluid communication with the inner plenum, wherein the air is adapted to pass from the inner plenum into the internal conduit; and
   (b) a plurality of segment bore holes between the internal conduit and the segment downstream face, wherein the bore holes provide fluid communication between the internal conduit and the segment downstream face, to provide for the air to pass from the internal conduit through the each segment of the one or more segments.

2. The premix fuel nozzle of claim 1, wherein the distal end of at least one segment of the one or more segments extends partially to the internal wall of the burner tube.

3. The premix fuel nozzle of claim 1, wherein the distal end of at least one segment of the one or more segments fully extends to the internal wall of the burner tube.

4. The premix fuel nozzle of claim 3, wherein the distal end of the at least one segment of the one or more segments that fully extends to the internal wall of the burner tube is closed and comprises a purge groove.

5. The premix fuel nozzle of claim 1, wherein said closed end has a plurality of cooling bore holes extending between the internal face and the outer body external face.

6. The premix fuel nozzle of claim 1, wherein the segment downstream face of the each segment of the one or more segments is planar.

7. The premix fuel nozzle of claim 6, wherein the each segment of the one or more segments has a U-shaped cross-section, wherein the cross-section is parallel to the longitudinal axis of the burner tube.

8. The premix fuel nozzle of claim 1, wherein an angle of the segment downstream face relative to the longitudinal axis of the burner tube is in a range of 105 to 165 degrees.

9. The premix fuel nozzle of claim 1, wherein the each segment of the one or more segments is equally circumferentially spaced about the outer body.

10. The premix fuel nozzle of claim 1, wherein the each segment of the one or more segments has an upstream face, wherein the upstream face is smoothly curved toward the segment downstream face.

11. The premix fuel nozzle of claim 1, wherein the each segment of the one or more segments has an upstream face, wherein the upstream face of the each segment of the one or more segments is angled relative to the longitudinal axis of the burner tube towards the downstream end of the burner tube.

12. The premix fuel nozzle of claim 1, wherein a circumferential cross-sectional area of the proximal end of the each segment of the one or more segments is larger than the circumferential cross-sectional area of the distal end of the each segment of the one or more segments.

13. A combustor for a gas turbine, comprising a reaction zone and one or more premix fuel nozzles, said one or more premix fuel nozzles for injecting a fuel and air mixture into the reaction zone, at least one of said one or more premix fuel nozzles comprising:
   (a) a fuel and air premixer;
   (b) a nozzle tip disposed in a burner tube, said burner tube having an internal wall, an open internal volume having a length extending between an upstream end and a downstream end of the burner tube, a longitudinal axis and a cross-sectional area perpendicular to the longitudinal axis, said nozzle tip comprising:
      (i) an outer body having an outer body external face facing the downstream end of the burner tube, said outer body external face having a smaller cross-sectional area than the cross-sectional area of the burner tube; and
      (ii) one or more segments radiating radially outwardly toward the internal wall of the burner tube from said outer body, wherein each segment of the one or more segments has a proximal end disposed adjacent to the outer body external face and a distal end disposed in a direction toward the burner tube, wherein the each segment of the one or more segments comprises a segment downstream face angled relative to the longitudinal axis of the burner tube towards the downstream end of the burner tube;
   whereby, when the gas turbine is in operation, an axial flow field of an air and fuel mixture flows through the burner tube and around the nozzle tip, and two or more recirculation zones of differing radial extent are generated on the nozzle tip by the one or more segments to provide strong flame holding and flame propagation;
   wherein the outer body surrounds an inner plenum, said inner plenum adapted to receive cooling air, said outer body having an open end and a closed end, said closed end having an internal face adjacent to the inner plenum;

wherein each segment of the one or more segments comprises:
   (a) an internal conduit having an open proximal end and a closed distal end, the open proximal end in fluid communication with the inner plenum, wherein the air is adapted to pass from the inner plenum into the internal conduit; and
   (b) a plurality of segment bore holes between the internal conduit and the segment downstream face, wherein the bore holes provide fluid communication between the internal conduit and the segment downstream face, to provide for the air to pass from the internal conduit through each segment of the one or more segments.

14. The combustor of claim 13, wherein said at least one of said one or more premix fuel nozzles is a single center premix fuel nozzle and wherein the combustor contains at least one outer premix fuel nozzle of a different type.

15. The combustor of claim 13, wherein said one or more premix fuel nozzles comprise a single center premix fuel nozzle and at least one outer premix fuel nozzle.

* * * * *